US006423922B1

(12) United States Patent
Nemchinsky

(10) Patent No.: US 6,423,922 B1
(45) Date of Patent: Jul. 23, 2002

(54) PROCESS OF FORMING AN ELECTRODE

(75) Inventor: Valerian Nemchinsky, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 09/870,896

(22) Filed: May 31, 2001

(51) Int. Cl.[7] .............................................. B23K 10/100
(52) U.S. Cl. .............. 219/121.52; 219/119; 219/121.48
(58) Field of Search ........................ 219/121.59, 121.52, 219/121.48, 74, 75, 119; 313/231.31, 231.41

(56) References Cited

U.S. PATENT DOCUMENTS

| | | | |
|---|---|---|---|
| 3,198,932 | A | 8/1965 | Weatherly |
| 3,930,139 | A | 12/1975 | Bykhovsky et al. |
| 4,056,644 | A | 11/1977 | Howard et al. |
| 4,304,984 | A | 12/1981 | Bolotnikov et al. |
| 4,749,594 | A | 6/1988 | Malikowski et al. |
| 4,766,349 | A | 8/1988 | Johansson et al. |
| 4,843,206 | A | 6/1989 | Azuma et al. |
| 5,021,627 | A | 6/1991 | Bersch et al. |
| 5,023,425 | A | 6/1991 | Severance, Jr. |
| 5,097,111 | A | 3/1992 | Severance, Jr. |
| 5,200,594 | A | 4/1993 | Okada et al. |
| 5,628,924 | A | 5/1997 | Yoshimitsu et al. |
| 5,676,864 | A | 10/1997 | Walters |
| 5,767,478 | A | 6/1998 | Walters |
| 5,776,556 | A | 7/1998 | Lazarov et al. |
| 5,851,678 | A | 12/1998 | Hasz et al. |
| 5,857,888 | A | 1/1999 | Tada et al. |
| 5,908,567 | A | 6/1999 | Sakuragi et al. |
| 6,020,572 | A | 2/2000 | Marner et al. |
| 6,066,827 | A | 5/2000 | Nemchinsky |

*Primary Examiner*—Mark Paschall
(74) *Attorney, Agent, or Firm*—Alston & Bird LLP

(57) ABSTRACT

A method of forming an electrode for a plasma arc torch is disclosed, and wherein the electrode comprises a copper holder defining an opening therein. An emissive element is secured to a cavity formed in a relatively non-emissive separator having a solid rear wall at one end thereof. The emissive element and separator are positioned within the opening defined by the copper holder such that the emissive element is surrounded by the separator and the copper holder. In this regard, the emissive element is prevented from movement along the longitudinal axis of the torch relative to the separator during a post-assembly heating step. In addition, the emissive element is not exposed to the atmosphere during the heating step, which allows a greater bond between the emissive element and the separator.

15 Claims, 4 Drawing Sheets

PROCESS OF FORMING AN ELECTRODE

FIELD OF THE INVENTION

The present invention relates to plasma arc torches, and more particularly to a method of forming an electrode for supporting an electric arc in a plasma arc torch.

BACKGROUND OF THE INVENTION

Plasma arc torches are commonly used for the working of metal, including cutting, welding, surface treatment, melting, and annealing. Such torches include an electrode which supports an arc which extends from the electrode to a work piece in the transferred arc mode of operation. It is also conventional to surround the arc with a swirling vortex flow of gas, and in some torch designs it is conventional to also envelop the gas and arc in a swirling jet of water.

The electrode used in conventional torches of the described type typically comprises an elongate tubular member composed of a material of high thermal conductivity, such as copper or a copper alloy. The forward or discharge end of the tubular electrode includes a bottom end wall having an emissive element imbedded therein, which supports the arc. The emissive element is composed of a material which has a relatively low work function, which is defined in the art as the potential step, measured in electron volts (ev), which permits thermionic emission from the surface of a metal at a given temperature. In view of this low work function, the element is thus capable of readily emitting electrons when an electrical potential is applied thereto. Commonly used materials include hafnium, zirconium, tungsten, and alloys thereof. The emissive element is typically surrounded by a relatively non-emissive separator, which acts to prevent the arc from migrating from the emissive element to the copper holder. A nozzle surrounds the discharge end of the electrode and provides a pathway for directing the arc towards the work piece.

More specifically, the emissive insert erodes during operation of the torch, such that a cavity or hole is defined between the emissive insert and the metallic holder. When the cavity becomes large enough, the arc “jumps” or transfers from the emissive insert to the holder, which typically destroys the electrode. To prevent or at least impede the arc from the emissive insert to the holder, which typically destroys the electrode. To prevent or at least impede the arc from jumping to the metallic holder, some electrodes includes a relatively non-emissive separator that is disposed between the emissive insert and the metallic holder. Separator are disclosed in U.S. Pat. No. 5,023,425, which is assigned to the assignee of the present invention and incorporated herein by reference.

The assignee of the present invention has previously developed a method for making an electrode which significantly improved service life, as described in U.S. Pat. No. 5,097,111, the entire disclosure of which is incorporated herein by reference. In particular, the ’111 patent discloses a method for making an electrode which includes the step of forming an opening in the front face of a cylindrical holder or blank of copper or copper alloy and inserting a relatively non-emissive separator, which is preferably formed of silver and sized to fit substantially with the opening. Next, the non-emissive separator is axially drilled to form a cavity having a solid rear wall in one embodiment at the back of the cavity, and a cylindrical emissive element is pressed into the cavity. To complete fabrication of the electrode, the front face of the assembly is machined to provide a smooth outer surface, which includes a circular outer end face of the emissive element, a surrounding annular ring of the non-emissive separator, and an outer ring of the copper holder.

While the method of forming an electrode described by the ’111 patent provides substantial advances in the art, further improvements are desired. In particular, it has been shown that heating the electrode after the emissive element has been pressed into the separator improves the life of the electrode by forming a diffusion bond between the emissive element and the separator. However, the post-assembly heating step described above oftentimes causes the emissive element to “pop” or migrate out of the cavity during the heating step. This is particularly true for emissive elements that are formed out of a combination of metal powders, which typically have a density of 90–95% of theoretical. In this regard, around 5–10% of the emissive element is composed of air voids between the powdered materials. These voids expand during the heating step, which causes the emissive element to move relative to the separator.

In addition, air can be trapped between the emissive element and the separator as the emissive element is inserted in the separator, which can also expand to move the emissive element relative to the separator during the heating step. This creates a gap between the emissive element and the solid rear wall of the cavity in the separator, which decreases the heat transfer capability of the electrode. Disadvantageously, a larger percentage of the emissive element is subsequently removed during the machining step, which wastes material.

It is also desirable to limit the exposure of the emissive element to the atmosphere during the assembly of the electrode. In particular, gases from the atmosphere, such as nitrogen, can pass between the emissive element and separator during the post-assembly heating step if the emissive element is exposed to the atmosphere, which can weaken the bond or interface therebetween. Accordingly, it is desirable to form an electrode for a plasma arc torch that restricts movement of the emissive element during assembly of the electrode. It is also desirable to form an electrode for a plasma arc torch wherein the emissive element is not exposed to the atmosphere during the post-assembly heating step so that an improved bond can be formed therebetween.

SUMMARY OF THE INVENTION

The present invention was developed to improve upon conventional methods of making electrodes and those methods disclosed in the ’111 patent. It has been discovered that the difficulties of the methods described above, namely movement of the emissive element in the separator during the post-assembly heating step as well as exposing the emissive element to the atmosphere during the heating step, can be overcome by positioning the emissive element in a cavity having a solid rear wall defined by the separator, inverting the assembly, and inserting the assembly into an opening or bore defined by the metallic holder such that the emissive element is fully surrounded by the separator and the metallic holder. Thus, during the post-assembly heating step the emissive element is prevented from moving relative to the separator. In addition, the emissive element is sealed from the atmosphere after the assembly is inserted in the opening of the holder, such that gases from the atmosphere cannot enter between the emissive element and the separator during the post-assembly heating step.

More particularly, in accordance with one preferred embodiment of the present invention, a method of forming an electrode for use in a plasma arc torch comprises at least partially inserting an emissive element into a separator having an open end and a closed end. The separator and emissive element are then at least partially inserted into an opening or bore having an open end and a closed end defined by a metallic blank such that the emissive element is positioned between the closed end of the metallic blank bore and the closed end of the separator cavity. To finish the electrode, at least part of the closed end of the separator is removed so as to expose the emissive element adjacent the open end of the metallic blank.

In one embodiment, the method further comprises heating the metallic blank, separator, and emissive element to a specific temperature for a predetermined period of time. The heating step acts to cause diffusion bonding between the metallic blank, separator, and emissive element. For example, heating the electrode to a temperature in the range of around 720–800° C., and more particularly around 750° C., can increase the life span of the electrode by a factor of two or three. In one embodiment, the heating step includes forming thermal conducting paths, preferably formed of silver, between the emissive element and the separator. Advantageously, the emissive element is sealed and surrounded by the separator and holder during the formation of the electrode. As such, the emissive element is prevented from moving during the post-assembly heating step, and a strong bond is formed between the emissive element and the separator.

The emissive element comprises a metallic material having a relatively low work function, such as hafnium, zirconium, or tungsten. The metallic material may also include powdered mixtures and alloys thereof, which may include elements such as silver, gold, copper, and aluminum. The relatively non-emissive separator is positioned about the emissive element such that the separator is interposed between and separates the metallic holder from the emissive element at the front end of the holder, whereby the separator acts to resist detachment of the electric arc from the emissive element and attachment of the arc to the metallic holder. The separator which surrounds the emissive element is preferably formed of a metallic material, such as silver, which is described in the '425 patent mentioned above. This serves to increase the service life of the electrode, since the silver and any oxide which does form are very poor emitters. As a result, the arc will continue to emit from the emissive element, rather than from the metallic holder or the separator, which increases the service life of the electrode. In a preferred embodiment, the separator has a tubular shape defining a cavity or opening at one end thereof and a solid wall at the other end such that the separator and the emissive element have a close-fitting relationship. In addition, the emissive element and separator can be brazed together using a brazing material, such as silver or silver alloy.

Accordingly, the present invention provides a method of forming an electrode having improved thermal conductivity by preventing movement of the emissive element relative to the separator during the heating step of forming the electrode. In addition, the present invention provides a method of forming an electrode wherein the emissive element is sealed from the atmosphere during the heating step of forming the electrode, such that gases or other materials from the atmosphere are prevented from migrating between the emissive element and the separator, which results in a stronger bond therebetween.

BRIEF DESCRIPTION OF THE DRAWINGS

Figure 1:
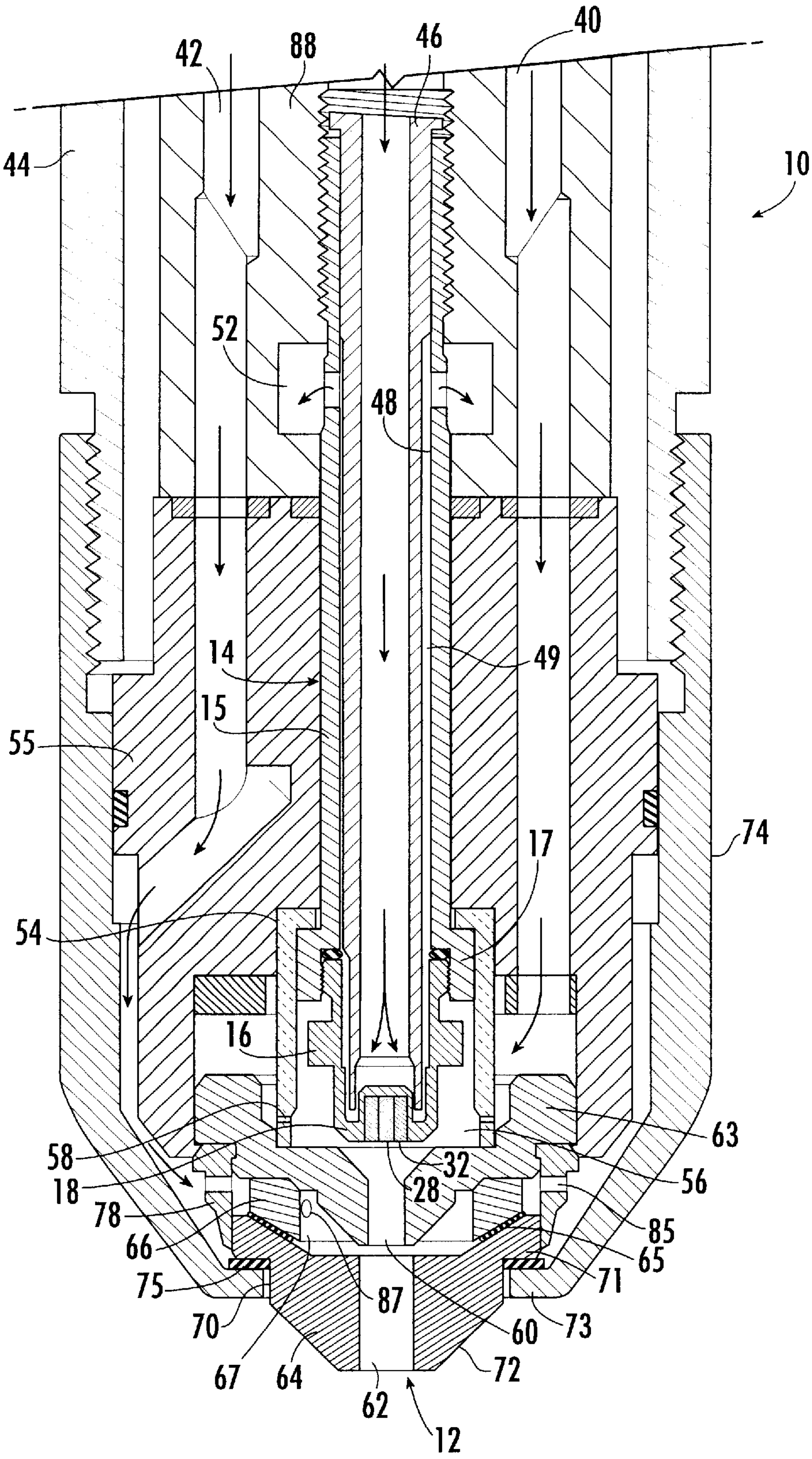
Figure 2:
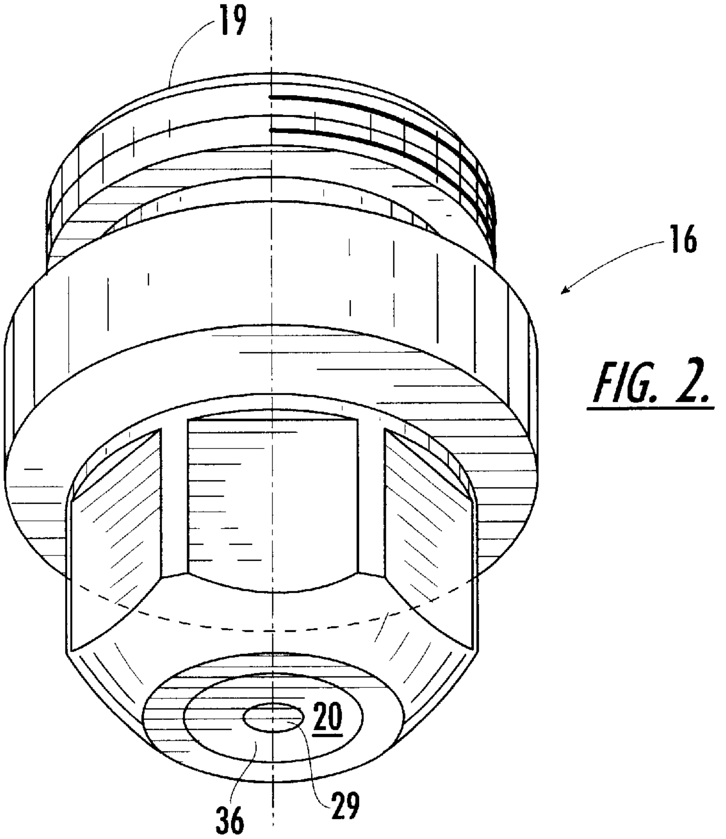
Figure 3:
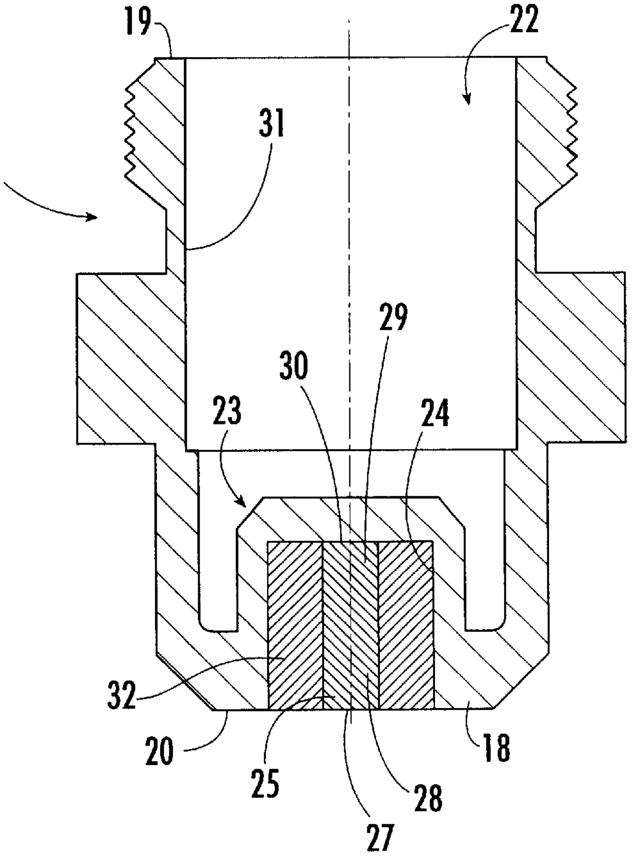
Figure 6:
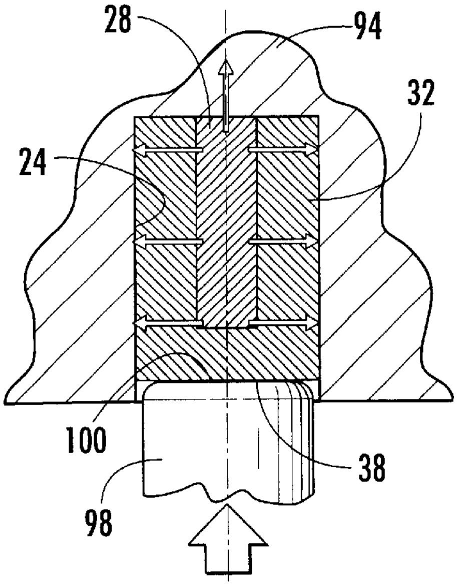
Figure 7:
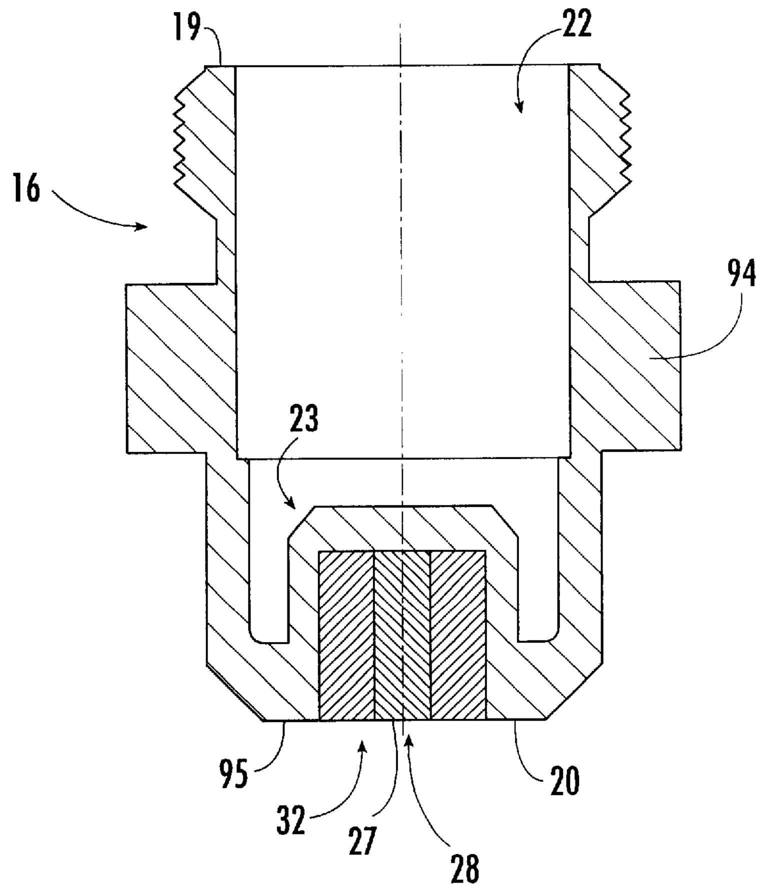
Figure 8:
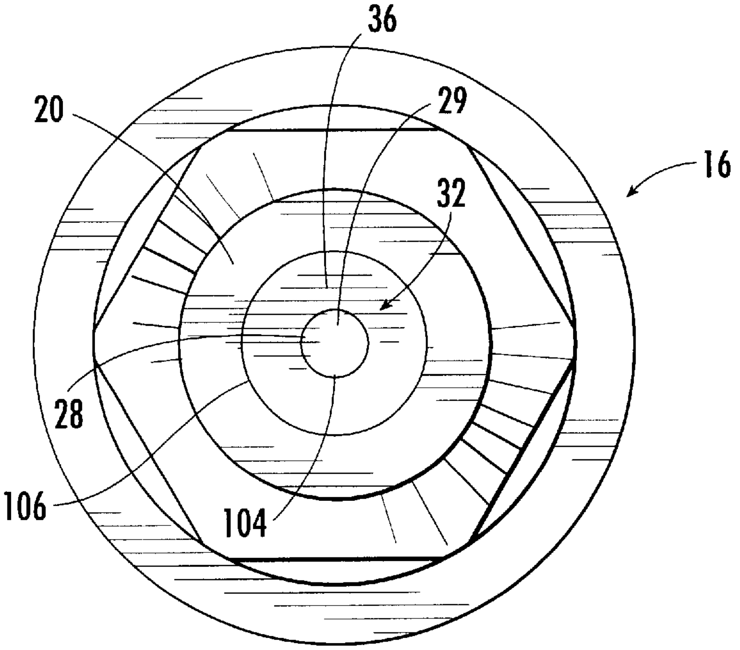

Having thus described the invention in general terms, reference will now be made to the accompanying drawings, which are not necessarily drawn to scale, and wherein:

FIG. 1 is a sectioned side elevational view of a plasma arc torch which embodies the features of the present invention;

FIG. 2 is an enlarged perspective view of an electrode in accordance with the present invention;

FIG. 3 is an enlarged sectional side elevational view of an electrode in accordance with the present invention;

FIGS. 4–7 are schematic views illustrating the steps of a preferred method of fabricating the electrode in accordance with the present invention; and FIG. 8 is an end elevational view of the finished electrode.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a plasma arc torch 10 embodying the features of the present invention is depicted. The torch 10 includes a nozzle assembly 12 and a tubular electrode 14. The electrode 14 preferably is made of copper or a copper alloy, and is composed of an upper tubular member 15 and a lower cup-shaped member or holder 16. The upper tubular member 15 is of elongate open tubular construction and defines the longitudinal axis of the torch 10. The upper tubular member 15 includes an internally threaded lower end portion 17. The holder 16 is also of tubular construction, and includes a lower front end and an upper rear end. A transverse end wall 18 closes the front end of the holder 16, and the transverse end wall 18 defines an outer front face 20 (FIG. 2). The rear end of the holder 16 is externally threaded and is threadably joined to the lower end portion 17 of the upper tubular member 15.

With primary reference to FIGS. 2–5, the holder 16 is open at the rear end 19 thereof such that the holder is of cup-shaped configuration and defines an internal cavity 22. The internal cavity 22 has a surface 31 that includes a cylindrical post 23 extending into the internal cavity along the longitudinal axis. A generally cylindrical opening or bore 24 is formed in the front face 20 of the end wall 18 and extend rearwardly along the longitudinal axis and into a portion of the holder 16.

An assembly comprising an emissive element or insert 28 and a relatively non-emissive separator 32 is mounted in the bore 24 and is disposed coaxially along the longitudinal axis. The emissive element 28 has a first end 29 and a first end face 30, which is preferably circular. The emissive element 28 also includes a generally circular second end 25 and a second end face 27 lying in the plane of the front face 20 of the holder 16 and opposite the first end face 30. The emissive element 28 is composed of a metallic material which has a relatively low work function, in a range of about 2.7 to 4.2 ev, so that it is adapted to readily emit electrons upon an electrical potential being applied thereto. Suitable examples of such materials are hafnium, zirconium, tungsten, and alloys thereof. To help form a bond between the emissive element 28 and the separator 32, a preferred embodiment of the emissive element comprises a powdered combination of materials, such as hafnium and silver. Other powders may also be used, such as powders of the materials described above. The powders are mixed in a predetermined ratio, such as 2:1 hafnium/silver or 1:1 hafnium/silver. Due to the physical nature of the powdered mixture, the emissive element 28 has a density less than that of a pure or "theoretical" material. For example, the density of the emissive element 28 according to a preferred embodiment is around 95% of theoretical. Thus, voids, such as air pockets, determine about 5% of the density, as discussed more fully below. According to one embodiment, the emissive element 28, which is pre-manufactured from powders in the form of a pellet, is secured to the separator 32 by a slight interference or press fit, although other securing methods can also be used.

The separator 32 is positioned in the bore 24 coaxially about the emissive element 28. The separator 32 has an outer peripheral wall 33 (FIGS. 4–5) extending the length of the bore 24, and an inner peripheral wall 34 extending substantially the length of the emissive element 28. In this regard, the separator 32 defines a cavity 35 having an open end and a closed end. More specifically, the cavity 35 is defined by an end face 37 lying in the plane of the first end face 30 of the emissive element 28, the inner peripheral wall 34, and a solid rear end wall 38 having an inner surface 39. In one embodiment, the inner surface 39 is in contact with the second end face 27 of the emissive element 28. The outer peripheral wall 33 is illustrated as having a substantially constant outer diameter over the length of the separator, although it will be appreciated that other geometric configurations would be consistent with the scope of the invention, such as frustoconical. At the second end face 27 of the emissive element 28, the separator 32 preferably has a radial thickness of at least about 0.01 inch between the inner peripheral wall 34 and the outer peripheral wall 33, and preferably the diameter of the emissive element 28 is about 30–80% of the diameter of the separator 32. As a specific example, the emissive element 28 typically has a diameter of about 0.08 inch and a length of about 0.25 inch, and the outer diameter of the separator 32 is about 0.25 inch.

The separator 32 is composed of a metallic material having a work function that is greater than that of the material of the holder 16, and also greater than that of the material of the emissive element 28. More specifically, it is preferred that the separator 32 be composed of a metallic material having a work function of at least about 4.3 ev. In a preferred embodiment, the separator 32 comprises silver as the primary material, although other metallic materials, such as gold, platinum, rhodium, iridium, palladium, nickel, and alloys thereof, may also be used.

For example, in one particular embodiment of the present invention, the separator 32 is composed of a silver alloy material comprising silver alloyed with about 0.25 to 10 percent of an additional material selected from the group consisting of copper, aluminum, iron, lead, zinc, and alloys thereof. The additional material may be in elemental or oxide form, and thus the term "copper" as used herein is intended to refer to both the elemental form as well as the oxide form, and similarly for the terms "aluminum" and the like.

With reference again to FIG. 1, the electrode 14 is mounted in a plasma torch body 88, which includes gas and liquid passageways 40 and 42, respectively. The torch body 88 is surrounded by an outer insulated housing member 44. A tube 46 is suspended within the central bore 48 of the electrode 14 for circulating a liquid cooling medium, such as water, through the electrode 14. The tube 46 has an outer diameter smaller than the diameter of the bore 48 such that a space 49 exists between the tube 46 and the bore 48 to allow water to flow therein upon being discharged from the open lower end of the tube 46. The water flows from a source (not shown) through the tube 46, inside the internal cavity 22 and the holder 16, and back through the space 49 to an opening 52 in the torch body 88 and to a drain hose (not shown). The passageway 42 directs injection water into the nozzle assembly 12 where it is converted into a swirling vortex for surrounding the plasma arc. The gas passageway 40 directs gas from a suitable source (not shown), through a gas baffle 54 of suitable high temperature material into a gas plenum chamber 56 via inlet holes 58. The inlet holes 58 are arranged so as to cause the gas to enter in the plenum chamber 56 in a swirling fashion. The gas flows out of the plenum chamber 56 through coaxial bores 60 and 62 of the nozzle assembly 12. The electrode 14 retains the gas baffle 54. A high-temperature plastic insulator body 55 electrically insulates the nozzle assembly 12 from the electrode 14.

The nozzle assembly 12 comprises an upper nozzle member 63 which defines the first bore 60, and a lower nozzle member 64 which defines the second bore 62. The upper nozzle member 63 is preferably a metallic material, and the lower nozzle member 64 is preferably a metallic or ceramic material. The bore 60 of the upper nozzle member 63 is in axial alignment with the longitudinal axis of the torch electrode 14.

The lower nozzle member 64 is separated from the upper nozzle member 63 by a plastic spacer element 65 and a water swirl ring 66. The space provided between the upper nozzle member 63 and the lower nozzle member 64 forms a water chamber 67.

The lower nozzle member 64 comprises a cylindrical body portion 70 which defines a forward or lower end portion and a rearward or upper end portion, with the bore 62 extending coaxially through the body portion 70. An annular mounting flange 71 is positioned on the rearward end portion, and a frustoconical surface 72 is formed on the exterior of the forward end portion coaxial with the second bore 62. The annular flange 71 is supported from below by an inwardly directed flange 73 at the lower end of the cup 74, with the cup 74 being detachably mounted by interconnecting threads to the outer housing member 44. A gasket 75 is disposed between the two flanges 71 and 73.

The bore 62 in the lower nozzle member 64 is cylindrical, and is maintained in axial alignment with the bore 60 in the upper nozzle member 63 by a centering sleeve 78 of any suitable plastic material. Water flows from the passageway 42 through openings 85 in the sleeve 78 to the injection ports 87 of the swirl ring 66, which injects the water into the water chamber 67. The injection ports 87 are tangentially disposed around the swirl ring 66, to impart a swirl component of velocity to the water flow in the water chamber 67. The water exits the water chamber 67 through the bore 62.

A power supply (not shown) is connected to the torch electrode 14 in a series circuit relationship with a metal workpiece, which is usually grounded. In operation, a plasma arc is established between the emissive element 28 of the electrode, which acts as the cathode terminal for the arc, and the workpiece, which is connected to the anode of the power supply and is positioned below the lower nozzle member 64. The plasma arc is started in a conventional manner by momentarily establishing a pilot arc between the electrode 14 and the nozzle assembly 12, and the arc is then transferred to the workpiece through the bores 60 and 62.

METHOD OF FABRICATION

The invention also provides a simplified method for fabricating an electrode of the type described above. FIGS.

Figure 4:
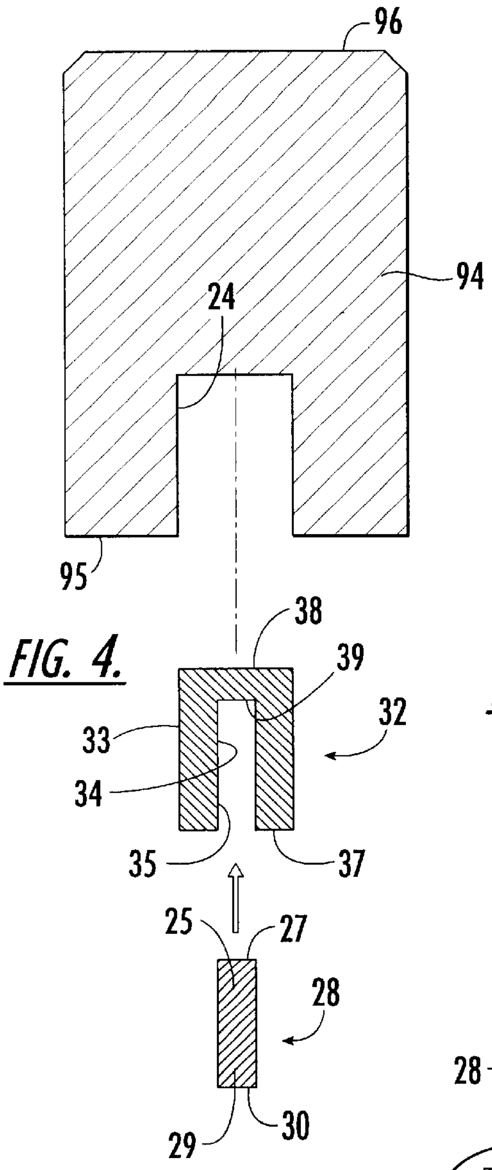

4–7 illustrate a preferred method of fabricating the electrode in accordance with the present invention. As shown in FIG. 4, a cylindrical blank 94 of copper or copper alloy is provided having a front face 95 and an opposite rear face 96. A generally cylindrical opening is then formed, such as by drilling, in the front face 95 so as to form a bore 24 having an open end and a closed end.

As previously described, a separator 32 is formed of a silver alloy material. In one embodiment, for example, the silver alloy material comprises silver alloy with about 0.25 to 10% of copper, although pure silver can also be used. The separator 32 is configured and sized to substantially occupy the bore 24 and for receiving the emissive element 28. More specifically, the outer peripheral wall 33 and rear wall 38 of the separator 32 are sized to have a close-fitting relationship with the bore 24, and the inner peripheral wall 34 and inner surface 39 are sized to have a close-fitting relationship with the emissive element 28. In this regard, the separator 32 may be formed by first forming a generally cylindrical solid blank and then forming a cylindrical cavity 35 coaxially therein, such as by drilling. Other methods of fabrication can also be used, such as extrusion.

As shown in FIG. 4, the emissive element 28 is positioned within the cylindrical cavity 35 of the separator 32 such that the emissive element is in contact with the solid end wall 39. In a preferred embodiment, the emissive element 28 comprises a combination of hafnium and silver powders that are pressed or compacted into the cavity 35 of the separator such that first end face 30 of the emissive element is lying in the plane of the end face 37 of the separator 32.

Figure 5:
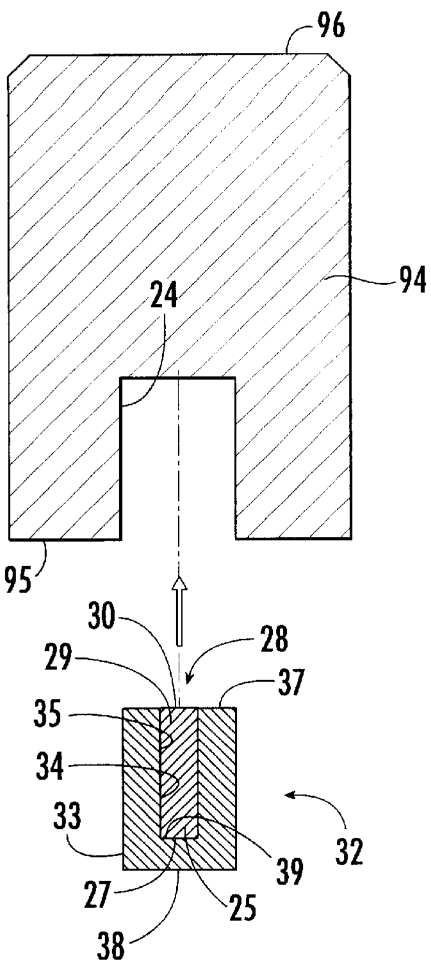

Next, as shown in FIG. 5, the emissive element 28 and separator 32 are positioned, such as by inverting or rotating the assembly, such that the open end face 37 of the separator 32 is facing the front face 95 and bore 24 of the cylindrical blank 94. The separator 32 and the emissive element 28 are then at least partially inserted in the bore 24 such that the outer peripheral wall 33 of the separator slidably engages the inner wall of the cavity. Preferably, the separator 32 and emissive element 28 are inserted into the bore 24 until the first end face 30 of the emissive element and the end face 37 of the separator are in contact with the surface of the cavity. As a result of the inserting step, the emissive element 28 is positioned between the closed end of the metallic blank bore 24 and the closed end of the separator cavity 35.

According to one embodiment shown in FIG. 6, a tool 98 having a generally planar circular working surface 100 is placed with the working surface in contact with the end wall 38 of the separator 32. The outer diameter of the working surface 100 is slightly smaller than the diameter of the bore 24 and the cylindrical blank 94. The tool 98 is held with the working surface 100 generally coaxial with the longitudinal axis of the torch 10, and force is applied to the tool so as to impart axial compressive forces to the emissive element 28 and the separator 32 along the longitudinal axis. For example, the tool 98 may be positioned in contact with the separator 32 and then struck by a suitable device, such as the ram of a machine. Regardless of the specific technique used, sufficient force is imparted so as to cause the emissive element 28 and the separator 32 to be deformed radially outwardly such that the emissive element is tightly gripped and retained by the separator, and the separator is tightly gripped and retained by the bore 24.

A further process in the formation of the electrode is heating the electrode in order to improve the bond between the emissive element 28 and the separator 32. Although FIG. 6 shows the heating step during the pressing step, the heating step preferably occurs after the pressing step. It has been determined that heating the electrode 14 to a high temperature, such as between 720–800° C., allows the emissive element 28 and separator 32 to form a strong diffusion bond, which can increase the life span of the electrode by a factor of two or three. This is especially true when the emissive element comprises powders of an emissive material and silver and the separator comprises silver, wherein the heating step allows the formation of thermal conducting paths extending between the emissive element 28 and the separator 32. In this example, the thermal conducting paths are formed of silver extending from the emissive element 28 to the separator 32.

One problem that may arise when using an emissive element comprising powdered materials, however, is the expansion of the voids or air pocket present in the emissive element during the heating step. The expansion of the voids can cause the emissive element to "pop" out of the separator in conventional electrodes, which leaves a gap between the emissive element and separator and decreases the thermal conductivity of the electrode. According to the present invention, however, the arrangement of the emissive element 28 and the separator 32 discussed above prevents the harmful movement of the emissive element relative to the separator. Moreover, the arrangement of the emissive element 28 and separator 32 according to the present invention solves another problem discussed above, namely exposing the separator to the atmosphere during the post-assembly heating step. Accordingly, the method of the present invention prevents gases, such as nitrogen, from entering between the emissive element 28 and the separator 32. As such, the bond formed between the emissive element 28 and the separator 32 is strong and not contaminated with extra gases from the atmosphere during the heating step.

FIG. 7 shows further steps in completing the fabrication of the holder 16, wherein the external periphery of the cylindrical blank 94 is shaped as desired, including formation of external threads at the rear end 19 of the holder 16. The front face 95 of the blank 94, the separator 32, and the emissive element 28 are machined so that they are substantially flat and flush with one another. More specifically, the front face 95 of the blank 94 and end wall 38 of the separator 32 are machined such that the end face 27 of the emissive element 28 is exposed and lying in the plane of the front face 20 of the holder 16.

FIG. 8 depicts an end elevational view of the holder 16. It can be seen that the separator 32 separates the end face 27 of the emissive element 28 from the front face 20 of the holder 16. The separator 32 has an annular shape including an inner perimeter 104 and an outer perimeter 106. Because the separator 32 is formed of the silver alloy material having a higher work function than that of the emissive element 28, the separator serves to discourage the arc from detaching from the emissive element and becoming attached to the holder 16. Thus, the present invention provides a method of making an electrode 14 for use in a plasma arc torch 10 wherein the emissive element 28 is secured to the separator 32 such that the emissive element is prevented from popping out of or migrating from the cavity 35 of the separator during the post-assembly heating step. In addition, the emissive element 28 is not exposed to the atmosphere during the heating step, which allows a stronger bond to develop between the emissive element and the separator 32 during the heating process.

Many modifications and other embodiments of the invention will come to mind to one skilled in the art to which this invention pertains having the benefit of the teachings presented in the foregoing descriptions and the associated drawings. For example, the separator and/or emissive element can have other shapes and configurations, such as conical or rivet-shaped, without departing from the spirit and scope of the invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming an electrode for use in a plasma arc torch, said method comprising the steps of:

at least partially inserting an emissive element into a separator that defines a cavity having an open end and a closed end;

at least partially inserting the open end of the separator into a metallic blank that defines a bore having an open end and a closed end, said inserting step comprising orienting the separator such that the emissive element is positioned between the closed end of the metallic blank bore and the closed end of the separator cavity; and removing at least part of the closed end of the separator so as to expose the emissive element adjacent the open end of the metallic blank.

2. A method according to claim 1, further comprising heating the metallic blank, separator, and emissive element to a specific temperature for a predetermined period of time.

3. A method according to claim 2, wherein the heating step occurs before the removing step.

4. A method according to claim 2, wherein the heating step comprises heating the metallic blank, separator, and emissive element to a temperature in the range of 720°–800° C.

5. A method according to claim 1, wherein removing at least part of the closed end of the separator comprises machining at least one selected from the group consisting of the metallic holder, separator, and emissive element.

6. A method according to claim 1, wherein at least partially inserting the emissive element into the separator comprises pressing the emissive element into the separator.

7. A method according to claim 6, wherein pressing the emissive element into the separator comprises mechanically pressing a powder containing at least one material from the group consisting of hafnium, tungsten, zirconium, silver, gold, copper, and aluminum.

8. An intermediate product for forming an electrode for a plasma arc torch, comprising:

a metallic blank having a front and rear end, the front end defining an opening having an inner surface;

a separator positioned at least partially within the opening of the metallic blank, the separator defining a cavity at one end and having a solid rear wall at the other end; and an emissive element positioned within the cavity of the separator, wherein the emissive element is completely encapsulated by the separator and the metallic blank.

9. An electrode according to claim 8, wherein the metallic blank is formed of at least one from the group consisting of copper, silver, aluminum, and alloys thereof.

10. An electrode according to claim 8, wherein the separator is formed of at least one from the group consisting of silver, gold, copper, aluminum, and alloys thereof.

11. An electrode according to claim 8, wherein the emissive element is formed of at least one from the group consisting of hafnium, tungsten, zirconium, silver, gold, copper, aluminum, and powdered mixtures thereof.

12. An intermediate product for forming an electrode for a plasma arc torch, comprising:

a metallic blank having a front and rear end, the front end defining an opening having an inner surface;

a separator positioned at least partially within the opening of the metallic blank, the separator defining a cavity at one end and having a solid rear wall at the other end; and an emissive element positioned within the cavity of the separator, wherein the emissive element is restrained from forward axial movement by the solid rear wall of the separator.

13. An electrode according to claim 12, wherein the metallic blank is formed of at least one from the group consisting of copper, silver, aluminum, and alloys thereof.

14. An electrode according to claim 12, wherein the separator is formed of at least one from the group consisting of silver, gold, copper, aluminum, and alloys thereof.

15. An electrode according to claim 12, wherein the emissive element is formed of at least one from the group consisting of hafnium, tungsten, zirconium, silver, gold, copper, aluminum, and powdered mixtures thereof.

* * * * *